US012053009B2

(12) United States Patent
Beaver et al.

(10) Patent No.: US 12,053,009 B2
(45) Date of Patent: Aug. 6, 2024

(54) METHOD OF REDUCING ASPARAGINE IN WHOLE GRAIN FLOURS

(71) Applicant: Intercontinental Great Brands LLC, East Hanover, NJ (US)

(72) Inventors: Michelle Beaver, East Hanover, NJ (US); James M. Manns, East Hanover, NJ (US); Isabel Moreira De Almeida, East Hanover, NJ (US); Bin Zhao, East Hanover, NJ (US); Juliette Denis de Rivoyre, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 115 days.

(21) Appl. No.: 17/144,790

(22) Filed: Jan. 8, 2021

(65) Prior Publication Data
US 2022/0218006 A1 Jul. 14, 2022

(51) Int. Cl.
*A21D 13/02* (2006.01)
*A21D 13/80* (2017.01)
(Continued)

(52) U.S. Cl.
CPC .............. *A23L 7/107* (2016.08); *A21D 13/02* (2013.01); *A21D 13/80* (2017.01); *A23L 7/197* (2016.08); *A23L 7/198* (2016.08); *A23V 2002/00* (2013.01)

(58) Field of Classification Search
CPC .......... A23L 7/107; A23L 7/197; A23L 7/198; A21D 13/80; A21D 13/02; A23V 2002/00
(Continued)

(56) References Cited

U.S. PATENT DOCUMENTS 3,833,737 A * 9/1974 Siegel .................... A21D 8/047
426/18
6,428,828 B1 * 8/2002 Jackson ................. A21D 8/042
426/18
(Continued)

FOREIGN PATENT DOCUMENTS

EP 2174556 4/2010
EP 2174556 A1 * 4/2010 ........... A23L 1/0151
(Continued)

OTHER PUBLICATIONS

JP-2004-283062—Machine translation. (Year: 2004).*
(Continued)

*Primary Examiner* — Hamid R Badr
(74) *Attorney, Agent, or Firm* — Fitch, Even, Tabin & Flannery LLP

(57) ABSTRACT

A method of reducing the asparagine content of whole grain flour for the production of baked goods includes treating whole grains by tempering the whole grains in an aqueous solution of an asparagine-reducing composition to concentrate and localize asparaginase activity in the bran and germ of the whole grains. In one approach, the asparagine-reducing composition may comprise an asparaginase enzyme. In another approach, the asparagine-reducing composition may comprise a yeast strain capable of degrading asparagine. The tempering treatment with the asparagine-reducing composition reduces asparagine in the whole grains by at least about 25%, resulting in a whole grain flour having an asparagine content of no more than about 250 ppm. Also described are baked goods having a reduced asparagine and acrylamide content comprising a whole grain flour obtained by treating whole grains with an asparagine-reducing composition during tempering.

18 Claims, 2 Drawing Sheets

(51) Int. Cl.
*A23L 7/10* (2016.01)
*A23L 7/104* (2016.01)

(58) Field of Classification Search
USPC ..................................................... 426/18, 28
See application file for complete search history.

(56) References Cited

U.S. PATENT DOCUMENTS

| | | |
|---|---|---|
| 2004/0058046 A1 | 3/2004 | Zyzak et al. |
| 2007/0178219 A1 | 8/2007 | Boudreaux et al. |
| 2008/0166452 A1* | 7/2008 | Corrigan .................. A23L 5/25 426/52 |
| 2011/0052758 A1 | 3/2011 | Greiner-Stoeffele et al. |
| 2012/0189757 A1 | 7/2012 | Haynes et al. |
| 2014/0227407 A1* | 8/2014 | Sun .......................... A23L 7/198 99/451 |
| 2015/0240265 A1 | 8/2015 | Prata et al. |
| 2016/0021896 A1 | 1/2016 | De Boer |
| 2018/0030428 A1 | 2/2018 | Matsui et al. |
| 2018/0042275 A1 | 2/2018 | Ortiz et al. |
| 2018/0192676 A1 | 7/2018 | Turgeon et al. |

FOREIGN PATENT DOCUMENTS

| | | |
|---|---|---|
| WO | 2007035752 A2 | 3/2007 |
| WO | 2010040855 A1 | 4/2010 |
| WO | 2011106874 A1 | 9/2011 |
| WO | 2012148543 | 11/2012 |

OTHER PUBLICATIONS

Peterson, E. E. et al. Appl. Microbiol. 17: 929-930 (Year: 1969).*
Xu et al., "The use of asparaginase to reduce acrylamide levels in cooked food," Food Chemistry 210 (2016) 163-171.
Alam et al., "Asparaginase conjugated magnetic nanoparticles used for reducing acrylamide formation in food model system," Bioresource Technology 269 (2018) 121-126.
Fredriksson et al., "Fermentation Reduces Free Asparagine in Dough and Acrylamide Content in Bread," Cereral Chemistry, AACC International Inc, US, vol. 81, No. 5, Sep. 1, 2004, pp. 650-653.
International Search Report and Written Opinion for International Application No. PCT/US2022/011015 dated May 3, 2022.

* cited by examiner

METHOD OF REDUCING ASPARAGINE IN WHOLE GRAIN FLOURS

FIELD

Methods are described herein that relate generally to reducing the asparagine content of whole grain flour, thereby lowering the acrylamide concentration of the whole grain flour when heat-processed and lowering the acrylamide concentration of heat-processed products containing the whole grain flour.

BACKGROUND

Acrylamide is a chemical that can form in some foods during high-temperature cooking processes. For example, acrylamide may be formed via non-enzymatic browning reactions between reducing sugars and amino acids, such as asparagine, via the Maillard reaction pathway at temperatures above about 120° C. As such, acrylamide formation can be a concern during the production of baked goods and other baked products. Moreover, asparagine is found primarily in the bran and germ of a whole grain, rather than the endosperm. Thus, whole grain flours can have levels of asparagine that are two thirds higher than in white flour formed primarily from endosperm, increasing the likelihood of acrylamide formation in baked goods that contain whole grain flour.

SUMMARY

Described herein are methods of reducing the asparagine content of whole grain flour via treatment of whole grains with an asparagine-reducing composition during tempering. In some approaches, the asparagine-reducing composition comprises an asparaginase enzyme. In other approaches, the asparagine-reducing composition comprises a yeast having or otherwise promoting asparaginase activity. Advantageously, in both approaches the asparaginase activity is localized and concentrated in the bran and germ of the whole grains, thereby maximizing the asparaginase activity during and after treatment.

In approaches where the asparagine-reducing composition comprises an asparaginase enzyme, the enzymatic treatment comprises tempering whole grains in an aqueous solution of asparaginase as the tempering medium. The aqueous solution of asparaginase may be included at about 5% to about 15% by weight of the tempering mixture. The asparaginase in the tempering medium hydrolyzes asparagine in the whole grains to aspartate and ammonia, thereby reducing the amount of asparagine in the whole grains available to form acrylamide during baking.

In some approaches, the asparaginase may have an asparaginase activity of about 3500 ASNU per gram of enzyme. In some approaches, the asparaginase may be derived from *Aspergillus oryzae*. The concentration of asparaginase in the tempering medium during tempering may be at least about 2550 ppm, for example, about 4550 ppm.

In approaches where the asparagine-reducing composition comprises a yeast, the yeast is included in the tempering medium, for example, in an amount of about 0.1% to about 4.0% by weight of the tempering mixture, and in some approaches from about 0.2% to about 2.0% by weight of the tempering mixture. Particularly useful asparagine-reducing yeast strains include baker's yeasts (i.e., *Saccharomyces cerevisiae*), and more specifically, non-GMO baker's yeast having asparaginase activity and/or are capable of degrading asparagine in an aqueous medium.

In some approaches, tempering with the asparagine-reducing composition may be conducted at ambient temperature, and in other approaches at a temperature of about 10° C. to about 60° C., for example at about 50° C. In some approaches, the tempering may be conducted for a duration of about 4 hours to about 8 hours. In other approaches, the tempering may be conducted for a longer duration, for example, up to 24 hours. In some approaches, tempering may be conducted even longer, for example, up to 32 hours, particularly when it is desired to obtain sprouted grains. The tempering process may generally be conducted under conditions effective to hydrate the whole grains to a suitable moisture content and to promote a high level of asparaginase activity based on the particular asparagine-reducing composition used. For example, in some approaches the final moisture content of the tempered grains may be about 14% to about 26% by weight. In some approaches, the tempered whole grains may be dried to obtain a moisture content suitable for milling, for example, to a moisture content of about 10% to about 16% by weight.

Following tempering, the whole grains may be milled, for example, to obtain a bran and germ fraction and an endosperm fraction. The bran and germ fraction may be optionally subjected to a stabilization treatment to reduce lipase, thereby forming a stabilized bran and germ fraction. The stabilized bran and germ fraction may then be combined with the endosperm fraction to form a stabilized whole grain whole grain flour having reduced levels of asparagine.

The whole grain flour obtained by tempering whole grains with the asparagine-reducing composition generally has an asparagine content of no more than about 250 ppm. In some approaches, tempering with the asparagine-reducing composition can reduce the asparagine content of the whole grain flour by at least about 25% compared to untreated whole grain flour.

In some approaches, at least a portion of the asparagine-reducing composition may be absorbed by the whole grains during tempering, primarily by the bran and germ of the whole grains. In this way, the asparaginase activity is concentrated in the portions of the whole grain containing the highest amounts of asparagine. At least a portion of the asparagine-reducing composition may also be retained in the whole grain flour after milling, allowing for continued hydrolyzation of asparagine in the whole grains following treatment and, in some cases, during storage and/or dough formation.

The resulting whole grain flour is especially useful for producing baked goods. Asparagine concentration has been shown to be the main limiting factor for acrylamide formation in whole grains. Thus, reducing the asparagine content of whole grains flour using the methods described here can significantly reduce undesirable acrylamide formation in baked goods containing the treated whole grain flour. For example, in some approaches, baked goods produced using reduced-asparagine whole grain flours described herein may exhibit a significant reduction in acrylamide of at least about 20% and up to about 50% or more compared to baked goods produced using untreated whole grain flour.

DETAILED DESCRIPTION

The term "whole grain" includes the grain in its entirety, for example as a wheat berry or kernel, prior to any processing. As indicated in the U.S. Food and Drug Administration (FDA) Feb. 15, 2006 draft guidance and as used herein, the term "whole grain" includes cereal grains that consist of the intact, ground, cracked or flaked fruit of the grains whose principal components—the starchy endosperm, germ and bran—are present in the same relative proportions as they exist in the intact grain. The FDA outlined that such grains may include barley, buckwheat, bulgur, corn, millet, flee, rye, oats, sorghum, wheat and wild rice.

The term "milling" as used herein includes the steps of rolling, breaking sifting and sorting the whole grain to separate it into its constituent parts, which may also result in some reduction of particle size of the constituent parts.

The term "grinding" as used herein includes any process directed to reducing particle size, including but not limited to colliding particles against one another or mechanically reducing the particle size.

The term "tempering" as used herein is the process of adding water to wheat before milling to toughen the bran and mellow the endosperm of the whole grain and thus improve flour separation efficiency.

Percentages used herein are by weight and based on the filling composition except as otherwise indicated.

Described herein are methods of reducing the asparagine content of whole grain flour for the production of baked goods and baked goods having a reduced acrylamide content containing whole grain flour having a reduced asparagine content. One technique for reducing acrylamide in baked goods includes adding asparaginase as an ingredient during dough formation to hydrolyze asparagine in the grains to aspartate (or aspartic acid) and ammonia, thereby reducing the amount of asparagine available to form acrylamide during heating. However, the high moisture content of doughs, and the presence of various dough ingredients, can undesirably inhibit or otherwise dilute the enzymatic activity of the asparaginase. Described herein is a superior method of reducing asparagine in whole grain flour at lower moisture contents to maximize, localize, and concentrate the enzymatic activity in high-asparagine portions of the whole grains, resulting in higher reductions in asparagine in the resulting whole grain flour, and therefore, lower acrylamide contents in baked goods containing the reduced-asparagine whole grain flour.

Figure 1:
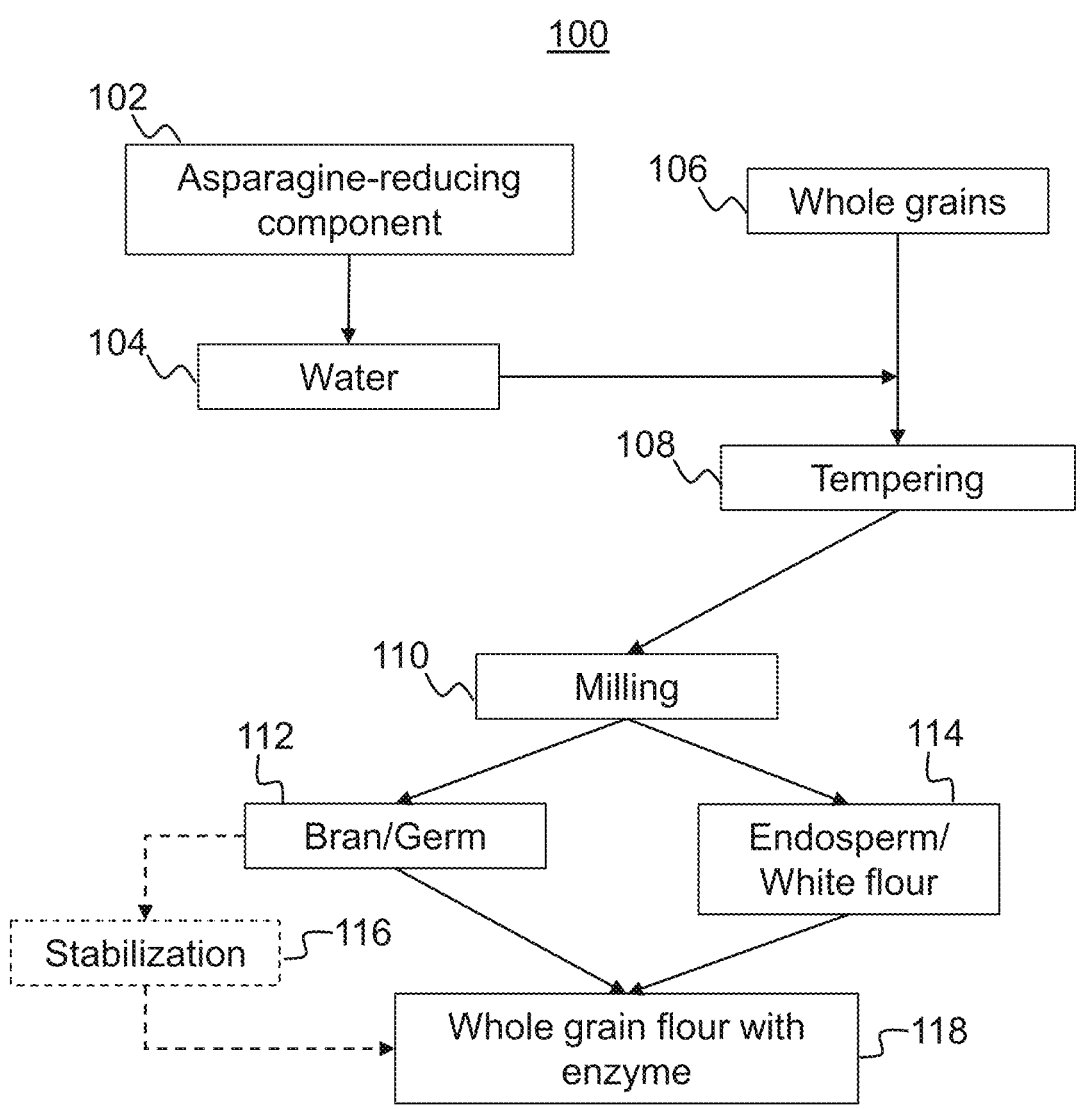
FIG. 1 is a process flow diagram of an exemplary method of reducing the asparagine content of whole grain flour for the production of baked goods.

An exemplary method of reducing the asparagine content of whole grain flour for the production of baked goods is shown in FIG. 1. Asparagine—an amino acid precursor to acrylamide—is present in high amounts in whole grains and is found primarily in the bran and germ of a whole grain. As a result of treating whole grains with an asparagine-reducing composition during tempering as described herein, asparaginase activity can be maximized and the asparagine content of whole grains (and flour produced therefrom) can be substantially reduced, thereby mitigating the formation of undesirable acrylamide in baked goods containing whole grain flour derived from the treated whole grains.

It is believed that treating whole grains with an asparagine-reducing composition during tempering has multiple advantages over, for instance, the use of asparaginase as an ingredient during dough formation or otherwise treating grains after milling. For example, during dough formation, asparaginase may be limited by other ingredients, such as, for example, salt, sugar, and leavening agents. The enzyme activity may also be reduced, or otherwise diluted, due to high moisture contents during dough formation (e.g., up to 50% moisture). Additionally, since the outer bran and germ of whole grains contain higher amounts of asparagine compared to the inner endosperm, treating whole grains with an asparagine-reducing composition during tempering (i.e., prior to milling) localizes and concentrates the asparaginase activity in the portions of the whole grains with highest asparagine content. Furthermore, conducting the enzymatic treatment on whole grains during tempering (i.e., earlier in the process for producing baked goods) allows for maximized asparaginase activity during treatment and thereafter. For example, since at least a portion of the asparagine-reducing composition may be absorbed in the bran and germ of the whole grains during tempering, asparaginase degradation may continue after tempering, milling, and even after the whole grain flour is added to the dough, resulting in a superior reduction in asparaginase activity and, by extension, an improved reduction in acrylamide formation.

As shown in FIG. 1, the treatment of whole grains with an asparagine-reducing composition during tempering may include admixing an asparagine-reducing composition 102 with water 104 to obtain a substantially aqueous tempering medium, which is admixed with whole grains 106.

Whole grains contain primarily endosperm, bran, and germ, in diminishing proportions, respectively. In whole wheat grains, for example, at field moisture of about 13% by weight, the endosperm or starch is about 83% by weight, the bran is about 14.5% by weight, and the germ is about 2.5% by weight, based upon the weight of the intact grain. The endosperm contains the starch and is lower in protein content than the germ and the bran. The endosperm also has a lower asparagine content than the bran and germ portions. The bran (pericarp or hull) is the mature ovary wall which is beneath the cuticle, and comprises all the outer cell layers down to the seed coat. It is high in non-starch-polysaccharides, such as cellulose and pentosans. The bran or pericarp is also higher in asparagine relative to the endosperm. The bran or pericarp tends to be very tough due to its high fiber content and imparts a dry, gritty mouthfeel, particularly when present in large particle sizes. It also contains most of the lipase and lipoxygenase of the grain which present a need for stabilization. As the extent of the grinding or milling increases, the bran particle size approaches the particle size of the starch, making the bran and starch harder to separate. Also, starch damage tends to increase due to more mechanical energy input, and abrasiveness of the bran compared to the endosperm, and rupturing of the starch granules. Also, mechanically damaged starch tends to be more susceptible to gelatinization. The germ is characterized by its high fatty oil content. It is also rich in crude proteins, sugars, and ash constituents.

Although not limited thereto, the whole grains used herein may be selected from, for example, soft/soft and soft/hard wheat berries. In some approaches, they may comprise white or red wheat berries, hard wheat berries, soft wheat berries, winter wheat berries, spring wheat berries, durum wheat berries, or combinations thereof. Examples of other whole grains that may be processed in accordance with various or certain embodiments or aspects include, for example, oats, corn, rice, wild rice, rye, barley, buckwheat, bulgar, millet, spelt, sorghum, and the like, and mixtures of whole grains. The whole grains may be in the form of, for example, whole grain kernels, flakes, and the like. Preferably, the whole grains are uncooked prior to tempering.

Referring again to FIG. 1, the whole grains 106 are subjected to tempering 108 in the tempering medium comprising water 104 and the asparagine-reducing composition 102.

In some approaches, the asparagine-reducing composition may comprise an asparaginase enzyme composition. The asparaginase enzyme composition may comprise any asparaginase enzyme or combination thereof and the asparaginase enzyme may be derived from any suitable source. In some approaches, the asparaginase enzyme may be in the form of a powder or have a granular form. In other approaches, the asparagine enzyme may be in the form of a liquid. In some approaches, the asparaginase enzyme may be derived from *Aspergillus oryzae*. In some approaches, the asparaginase enzyme may have an asparaginase activity of about 3500 ASNU per gram of enzyme. One non-limiting exemplary asparagine enzyme which may be employed in embodiments described herein include Acrylaway® 3500 BG manufactured by Novozymes A/S, Bagsvaerd, Denmark. Another non-limiting exemplary asparaginase enzyme which may be employed in embodiments described herein include Acrylaway® L manufactured by Novozymes A/S, Bagsvaerd, Denmark. The concentration of asparaginase during tempering is generally at least about 2550 ppm, and in some approaches may be about 4550 ppm.

In other embodiments, the asparagine-reducing composition may comprise a yeast strain having asparaginase activity. Particularly useful asparagine-reducing yeast strains are baker's yeasts (i.e., *Saccharomyces cerevisiae*), and more specifically, non-GMO baker's yeast having asparaginase activity and/or are capable of degrading asparagine in an aqueous medium. One non-limiting exemplary asparagine-reducing yeast which may be employed in embodiments described herein includes Acryleast™, a clean-label baker's yeast manufactured by Kerry, Naas, Ireland. The amount of the asparagine-reducing yeast included in the tempering medium may range from, for example, from about 0.1% to about 4.0% by weight of the tempering mixture, and in some approaches from about 0.2% to about 2.0% by weight of the tempering mixture.

In some approaches, the tempering 108 may be conducted in conventional tempering vats, containing tempering water 104 and the whole grains 106, and the asparagine-reducing composition 102 may be added to the water 104 in the tempering vats. In other embodiments, the asparagine-reducing composition 102 may be premixed with all or a portion of the tempering water 104 to obtain an aqueous tempering medium which is added to the tempering vats for admixture with the whole grains 106. In either case, the amount of tempering medium containing the water 104 and asparagine-reducing composition 102 is about 5% to about 15% by weight of the tempering mixture.

The moisture content of the whole grains may be controlled by tempering the whole grains with asparagine-reducing composition such that exterior portions of the grains are hydrated or moistened without substantially moistening interior portions thereof. Such treatment avoids or substantially reduces the need to dry the fine fraction obtained from the interior or endosperm of the kernel or grain, while moistening the exterior or bran and germ portions of the kernel or grain for subsequent stabilization treatment, if needed or desired. Such treatment also localizes and concentrates the asparaginase activity in the bran and germ portions of the kernel or grain, which contain higher amount of asparagine compared to the inner endosperm portion.

Tempering of the whole grains may be conducted in any suitable vessel, for example in a bath or vat. Tempering times may range from about 2 hours to up to 32 hours, depending on the particular asparagine-reducing composition used and the final moisture content desired.

For example, in approaches where the asparagine-reducing composition used in the tempering medium is asparaginase, tempering times may range, for example, from about 4 hours to about 8 hours to adequately moisten the whole grains and to sufficiently reduce the asparagine content therein. In other approaches, the tempering time may be up to 24 hours. In approaches, where the asparagine-reducing composition used in the tempering medium is an asparagine-reducing yeast composition, tempering times may range, for example, from about 10 hours to about 32 hours, and in some approaches from about 14 hours to about 30 hours. It should be noted that tempering times should be appropriate for effectively hydrating the whole grains to a suitable moisture content and for promoting a high level of asparaginase activity based on the particular asparagine-reducing composition used.

In some approaches, the whole grains may be tempered to obtain a moisture content of about 14% by weight to about 26% based upon the weight of the whole grains, more preferably from about 15% to about 24%, and most preferably from about 16% to about 22% in certain approaches. In approaches where the asparagine-reducing composition is a yeast, the inventors found that the yeast had particularly high asparaginase activity at a grain moisture content of about 21% by weight.

As discussed herein, at least a portion of the asparagine-reducing composition may be absorbed by the whole grains during tempering, allowing for continued asparaginase activity following tempering and milling, during storage, and even during dough formation. Thus, it is generally preferable to select tempering times and a final moisture to obtain moisture contents suitable for milling while also maximizing continued asparaginase activity after tempering.

In some embodiments, tempering with the asparagine-reducing composition may be conducted at a temperature of from about 10° C. to about 60° C., for example at about 50° C. Preferably, the tempering is conducted without the application of active heat. In some approaches, the tempering may be conducted at ambient temperature, which may vary at times based on, for example, environmental factors. Nevertheless, it is preferable that the tempering be conducted at temperatures no higher than 60° C. The tempering temperature may also be selected to avoid substantial starch gelatinization, protein denaturation, and/or asparaginase or yeast deactivation.

In some approaches, tempering temperatures and moisture contents may be controlled so that starch gelatinization may be less than about 25%, preferably less than about 10%, most preferably less than about 5%, as measured by differential scanning calorimetry (DSC). The low degree of starch gelatinization and low degree of starch damage achieved are exemplified by a starch melting enthalpy of greater than about 4 J/g, preferably greater than about 5 J/g, based upon the weight of starch in the bran and germ fraction, as measured by differential scanning calorimetry (DSC), at a peak temperature of from about 65° C. to about 70° C. In embodiments, the bran and germ fraction may have a starch melting enthalpy of greater than about 2 J/g, based upon the weight of the bran and germ fraction, as measured by differential scanning calorimetry (DSC), at a peak temperature of from about 60° C. to about 65° C. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," Cereal Foods World, Vol. 33, No. 3, pgs. 306-311 (March 1988).

The low degree of starch gelatinization and starch damage may be measured by the sodium carbonate-water solvent retention capacity (SRC sodium carbonate). Solvent retention capacity (SRC) may be measured by mixing a sample of the ingredient or component, such as a whole grain flour, having a weight (A), e.g., about 5 g, with a large excess of water or other solvent, such as an aqueous solution of sodium carbonate (e.g. 5% by weight sodium carbonate) and centrifuging the solvent-flour mixture. The supernatant liquid may then be decanted and the sample may be weighed to obtain the weight of the centrifuged wet sample (B), wherein the SRC value is calculated by the following equation: SRC value=$((B-A)/A))\times 100$. In some embodiments, the reduced-asparagine whole grain flour may have a sodium carbonate-water solvent retention capacity (SRC sodium carbonate) comparable to the control.

Referring back to FIG. 1, following tempering, the whole grains may be subjected to conventional milling 110 to obtain a bran and germ fraction 112 and a separated endosperm fraction 114.

Exemplary milling techniques include flour milling and/or grinding operations for obtaining a bran and germ fraction and an endosperm fraction, and for obtaining flours and fractions and components having particle size distributions such as disclosed, for example, in U.S. Patent Application Publication Nos. US 2005/0136173, US 2006/0073258, 2007/0269579, 2007/0292583; U.S. Pat. Nos. 7,258,888, 8,133,527 and 8,173,193; and International Patent Application Publication No. WO 2007/149320. In some embodiments, the flour milling and/or grinding operations for obtaining a bran and germ fraction and an endosperm fraction, and for obtaining flours and fractions and components having particle size distributions as disclosed in U.S. Patent Application Publication No. 2007/0292583; U.S. Pat. Nos. 8,133,527 and 8,173,193; and International Patent Application Publication Nos. WO 2007/149320 and WO 2012/148543 can be employed. The disclosures of each of the references identified in this paragraph are herein incorporated by reference in their entireties.

In some approaches, the bran and germ fraction 112 may be optionally subjected to one or more stabilization treatments 116, with or without heat, to inactivate lipase or reduce lipase activity prior to recombining with the endosperm fraction 114. Exemplary stabilization treatments may include, for example, stabilization by treatment with a lipase inhibitor as disclosed in International Patent Publication No. WO 2012/142399 and/or stabilization by heating while conveying and mixing as disclosed in WO 2014/149810 (the disclosures of which are herein incorporated by reference in their entireties), which may be employed with the enzymatic tempering of the present application to help reduce wheaty flavors and enhance the caramelized flavor of the products produced by the methods disclosed therein, provided the lipase inhibitor stabilization treatment conditions, such as pH, or the lipase inhibitor itself, do not adversely affect the reduction of asparagine using the asparaginase tempering method described herein.

Regardless of whether one or more of the separated fractions are further processed, stabilized, etc., the bran and germ fraction is recombined with the endosperm fraction to form the reduced-asparagine whole grain flour. In some embodiments, the bran and germ fraction may be derived from the same whole grains from which the endosperm fraction is derived. However, in other embodiments, the bran and germ fraction may be combined or blended with an endosperm fraction which is derived or obtained from a different source of grains. In each embodiment however, the bran and germ fraction and the endosperm fraction are combined or blended so as to provide an enzyme treated whole grain flour which contains endosperm, bran and germ in the same or substantially the same relative proportions as they exist in the intact grain.

In some embodiments, the reduced-asparagine whole grain flour may have a particle size distribution of 0% by weight on a No. 35 (500 micron) U.S. Standard Sieve, and less than or equal to about 20% by weight, preferably less than or equal to about 10 or 5% by weight on a No. 70 (210 micron) U.S. Standard Sieve. In a further embodiment, the reduced-asparagine whole grain flour may have a particle size distribution of up to about 100% by weight through a No. 70 (210 micron) U.S. Standard Sieve. Also, the reduced-asparagine whole grain flour may also have a particle size distribution of at least 75% by weight, preferably at least 85% by weight, for example from about 90% by weight to about 98% by weight, less than or equal to 149 microns and less than or equal to 5% by weight greater than 250 microns. In certain aspects, the bran and germ fraction may have a fine particle size distribution of 0% by weight on a No. 35 (500 micron) U.S. Standard Sieve, and less than or equal to about 20% by weight on a No. 70 (210 micron) U.S. Standard Sieve.

The whole grain flour 118 obtained by tempering whole grains with an asparagine-reducing composition as described herein exhibits a superior reduction in asparagine content. For example, the resulting reduced-asparagine whole grain flour generally has an asparagine content of no more than about 250 ppm. In some approaches, the tempering treatment described herein may reduce the asparagine content of the whole grain flour by at least about 25% compared to untreated whole grain flour. In some approaches, the reduction in asparagine content may be at least about 30%, at least about 35%, at least about 40%, at least about 45%, at least about 50%, at least about 55%, at least about 60%, at least about 65%, and in some approaches at least about 70% compared to untreated whole grain flour.

The reduced-asparagine whole grain flours described herein can be packaged, stably stored, and subsequently or immediately further used in food production. The reduced-asparagine whole grain flour is ready for further processing into the finished food products by adding water and other applicable food ingredients, mixing, shaping, and baking or frying, etc. Doughs containing the reduced-asparagine whole grain flour may be continuously produced and machined, for example sheeted, laminated, molded, extruded, or coextruded, and cut, on a mass production basis.

The reduced-asparagine whole grain flours described herein may be used in a wide variety of food products, and are particularly useful in products that are cooked, baked, or otherwise heat-treated, and thereby susceptible to acrylamide production. For example, in some approaches, baked goods produced using reduced-asparagine whole grain flours produced as described herein may exhibit a significant reduction in acrylamide of at least about 20%, at least about 25%, at least about 30%, at least about 35%, at least about 40%, and in some approaches at least about 45% compared to baked goods produced using untreated whole grain flour. In some approaches, the reduction in acrylamide content may be at least about 50% or more compared to baked goods produced using untreated whole grain flour.

The food products may include farinaceous food products, and biscuit type products in particular, pasta products, ready-to-eat cereals, and confections. In some embodiments, the food products may be bakery products or snack foods. The bakery products may include cookies, crackers, pizza crusts, pie crusts, breads, bagels, pretzels, brownies, muffins, waffles, pastries, cakes, quickbreads, sweet rolls, donuts, fruit and grain bars, tortillas, and par-baked bakery products. The snack products may include snack chips and extruded, puffed snacks. The food product particularly may be selected from cookies, crackers, and cereal crunch bars. The cookies may be bar-type products, extruded, coextruded, sheeted and cut, rotary molded, wire cut, or sandwich cookies. Exemplary of cookies which may be produced include sugar wafers, fruit filled cookies, chocolate chip cookies, sugar cookies, and the like. The crackers may be fermented or non-fermented type crackers, and graham crackers. The baked goods produced may be biscuit, crackers, or cookies having a full fat content or they may be a reduced fat, low-fat, or no-fat product.

In addition to water, biscuit, cookie, cracker, and snack ingredients which may be admixed with the reduced-asparagine whole grain flour include enriched wheat flour, vegetable shortening, sugar, salt, high fructose corn syrup, leavening agents, flavoring agents and coloring agents. Enriched wheat flours which may be used include wheat flours enriched with niacin, reduced iron, thiamine mononitrate and riboflavin. Vegetable shortenings which may be used include those made of partially hydrogenated soybean oil. Leavening agents which may be used include calcium phosphate and baking soda. Coloring agents which may be used include vegetable coloring agents such as annatto extract and turmeric oleoresin.

In some embodiments, the dough made includes dough comprising various combinations of the aforementioned biscuit, cookie, cracker, and snack ingredients in conventional amounts. According to some embodiments, all of the foregoing ingredients are homogeneously admixed and the amount of water is controlled to form a dough of desired consistency. The dough may then be formed into pieces and baked or fried to produce products having excellent moisture, geometry, appearance, texture, and flavor attributes.

In some approaches, the total amount of the flour component, the reduced-asparagine whole grain flour and optional other flours which may be used in the baked good compositions, such as cookies, biscuits and crackers, may range, for example, from about 20% by weight to about 80% by weight, preferably from about 45% by weight to about 75% by weight, based upon the weight of the dough, not including the weight of inclusions. Unless otherwise indicated, all weight percentages are based upon the total weight of all ingredients forming the doughs or formulations, except for inclusions such as confectionary or flavor chips or chunks, nuts, raisins, and the like. Thus, "the weight of the dough" does not include the weight of inclusions, but "the total weight of the dough" does include the weight of inclusions.

Process-compatible ingredients, which can be used to modify the texture of the products produced, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In some embodiments, humectant sugars, such as high fructose corn syrup, maltose, sorbose, galactose, corn syrup, glucose syrup, invert syrup, honey, molasses, fructose, lactose, dextrose, and mixtures thereof, may be used to promote chewiness in the baked product.

In addition to the humectant sugars, other humectants, or aqueous solutions of humectants which are not sugars or possess a low degree of sweetness relative to sucrose, may also be employed in the dough or batter. For example, glycerol, sugar alcohols such as mannitol, maltitol, xylitol and sorbitol, and other polyols, may be used as humectants. Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In some embodiments, the total sugar solids content, or the texturizing ingredient content, such as of the doughs produced, may range from zero up to about 50% by weight, based upon the weight of the dough, not including the weight of inclusions.

The sugar solids may be replaced in whole or in part by a conventional sugar substitute or conventional bulking agent such as polydextrose, hollocellulose, microcrystalline cellulose, mixtures thereof, and the like. Polydextrose is a preferred sugar substitute or bulking agent for making reduced calorie baked goods. Exemplary replacement amounts may be at least about 25% by weight, for example at least about 40% by weight, preferably from about 50% by weight to about 75% by weight, of the original sugar solids content.

In some embodiments, the amount of the conventional sugar substitute, conventional bulking agent, or conventional flour substitute, such as polydextrose, may be from about 10% by weight to about 35% by weight, for example from about 15% by weight to about 25% by weight, based upon the weight of the dough, not including the weight of the inclusions.

The moisture contents of the doughs should be sufficient to provide the desired consistency to enable proper forming, machining, and cutting of the dough. The total moisture content of the doughs will include any water included as a separately added ingredient, as well as the moisture provided by flour, the moisture content of any bulking agent or flour substitute such as a resistant starch type III ingredient, and the moisture content of other dough additives included in the formulation, such as high fructose corn syrup, invert syrups, or other liquid humectants.

Oleaginous compositions which may be used to obtain the doughs and baked goods may include any known shortening or fat blends or compositions, useful for baking applications, such as butter, and they may include conventional food-grade emulsifiers. Vegetable oils, lard, marine oils, and mixtures thereof, which are fractionated, partially hydrogenated, and/or interesterified, are exemplary of the shortenings or fats which may be used. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions comprise soybean oil. In embodiments, the dough may include up to about 30% by weight, for example from about 5% by weight to about 25% by weight of at least one oil or fat, based upon the weight of the dough.

Baked goods which may be produced using the reduced-asparagine whole grain flour described herein include reduced calorie baked goods which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

In addition to the foregoing, the doughs may include other additives conventionally employed in crackers and cookies. Such additives may include, for example, milk by-products, egg or egg by-products, cocoa, vanilla or other flavorings, in conventional amounts.

A source of protein, which is suitable for inclusion in baked goods, may be included in the doughs employed to promote Maillard browning. The source of protein may include non-fat dry milk solids, dried or powdered eggs, mixtures thereof, and the like. The amount of the proteinaceous source may, for example, range up to about 5% by weight, based upon the weight of the dough, not including the weight of inclusions.

The dough compositions may contain up to about 5% by weight of a leavening system, based upon the weight of the dough, not including inclusions. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

The doughs employed may include antimycotics or preservatives, such as calcium propionate, potassium sorbate, sorbic acid, and the like. Exemplary amounts, to assure microbial shelf-stability, may range up to about 1% by weight of the dough, not including the weight of inclusions.

Emulsifiers may be included in effective, emulsifying amounts in the doughs. Exemplary emulsifiers which may be used include mono- and di-glycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough, not including the weight of inclusions.

Production of the doughs may be performed using conventional dough mixing techniques and equipment used in the production of biscuit, cookie, and cracker doughs.

While baking times and temperatures will vary for different dough or batter formulations, oven types, etc., in general, commercial cookie, brownie and cake-baking times may range from about 2.5 minutes to about 15 minutes, and baking temperatures may range from about 250° F. (121° C.) to about 600° F. (315° C.).

The baked products may have a relative vapor pressure ("water activity") of less than about 0.7, preferably less than about 0.6, for preservative free microbial shelf-stability. Cookie, brownie and cake products generally have a moisture content of less than about 20% by weight, for example, from about 2% by weight to about 9% by weight for cookies, based upon the weight of the baked product, exclusive of inclusions.

For example, in some embodiments, a dough for producing a shelf-stable cracker or cookie, such as a graham cracker may include from about 40% by weight to about 65% by weight of the whole grain flour, from about 15% by weight to about 25% by weight of at least one sugar such as sucrose, from about 5% by weight to about 25% by weight of at least one oil or fat such as vegetable oil or shortening, from about 0% by weight to about 10% by weight of at least one humectant sugar such as high fructose corn syrup and honey, from about 0% by weight to about 1% by weight of a protein source such as non-fat dry milk solids, from about 0% by weight to about 1% by weight of a flavoring, such as salt, from about 0.5% by weight to about 1.5% by weight of leavening agents, such as ammonium bicarbonate and sodium bicarbonate, and from about 8% by weight to about 20% by weight of added water, where each weight percentage is based upon the weight of the dough, and the weight percentages add up to 100% by weight.

In embodiments, baked goods containing whole grain flour derived from treating whole grains during tempering with an asparagine-reducing composition such as asparaginase or certain yeasts having asparaginase activity as described herein exhibit a reduced acrylamide content due to the reduced asparagine content of the whole grains. For example, in some approaches, baked goods produced using reduced-asparagine whole grain flours described herein may exhibit a significant reduction in acrylamide of at least about 20%, at least about 25%, at least about 30%, at least about 35%, at least about 40%, and in some approaches at least about 45% compared to baked goods produced using untreated whole grain flour. In some approaches, the reduction in acrylamide content may be at least about 50% or more compared to baked goods produced using untreated whole grain flour.

Example 1

An experiment was carried out to demonstrate the substantial reduction in the asparagine content of whole grains treated with an aqueous solution of asparaginase during tempering compared to whole grains tempered without asparaginase. A sample of uncooked whole wheat kernels was tempered at 2% water addition at ambient temperature. The final moisture content of the tempered whole grains was between 9% and 15%. The tempered whole grains were then milled to obtain a whole grain flour.

Another sample of uncooked whole wheat kernels was tempered at 11% water addition and containing 4550 ppm of asparaginase. Tempering was conducted at 50° C. and the final moisture content of the tempered whole grains was between 20% and 26%. The whole grains were then milled to obtain a whole grain flour.

The asparagine content of the whole grain flour obtained from the untreated whole grains was 292 ppm, while the whole grain flour obtained from the whole grains enzymatically treated with asparaginase during tempering had an asparagine content of 194 ppm—an asparagine reduction of more than 30%. This example demonstrates the significant reduction in asparagine content achieved by tempering whole grains using an aqueous solution of asparaginase as the tempering medium.

Example 2

This example illustrates the reduction of asparagine in whole grain flour obtained from tempering whole wheat kernels in a solution containing an asparagine-reducing yeast composition using varying treatment parameters such as yeast level, moisture level, and duration of tempering, as shown in Table 1.

TABLE 1

| Variable | Units | Low | Medium | High |
| --- | --- | --- | --- | --- |
| Yeast level | % of Kernel DM | 0.2 | 1 | 2 |
| Moisture level | % | 16 | 18 | 21 |
| Duration of tempering | Hours | 14 | 22 | 30 |

Whole wheat kernels were tempered in a solution containing an asparagine-reducing yeast. The yeast used in the tempering medium was a baker's yeast that had been grown on selective media to promote asparaginase activity. The whole grains had a moisture content of less than 15% prior to tempering. The yeast was dissolved in water and the solution was added to the tempering medium to achieve a yeast level of between 0.2% and 2% by weight of the tempering mixture. Tempering was conducted for varying durations between 14 hours and 30 hours to obtain moisture contents between 16% and 21%. A control sample of whole wheat kernels was tempered in a water solution for 14 hours to obtain a moisture content of 16%.

Specific tempering conditions for each sample are provided in Table 2.

TABLE 2

| Sample ID | Yeast level (% of kernel DM) | Moisture level (%) | Duration (hours) |
| --- | --- | --- | --- |
| S1 | 2 | 16 | 14 |
| S2 | 1 | 21 | 22 |
| S3 | 0.2 | 18 | 30 |
| S4 | 0 | 16 | 14 |
| S5 | 1 | 18 | 22 |
| S6 | 1 | 16 | 30 |
| S7 | 1 | 18 | 14 |
| S8 | 0.2 | 16 | 22 |
| S9 | 2 | 21 | 30 |

Figure 2:
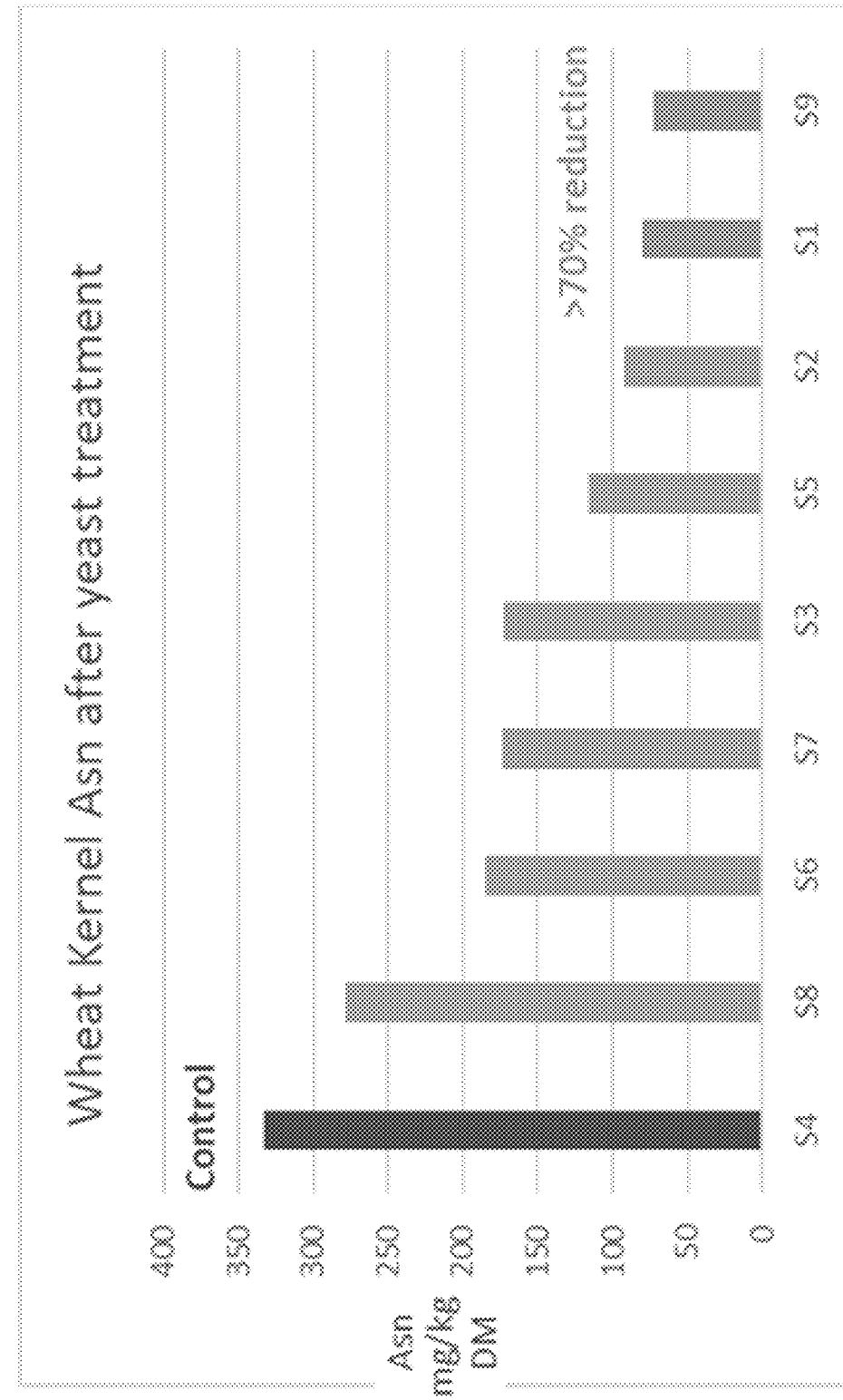
FIG. 2 is a graph illustrating asparagine reducing following tempering with an asparagine-reducing yeast.

Following tempering, the whole wheat kernels were milled and the asparagine content of the resulting flours was measured. Results of the experiment are illustrated in Table 3 below and in FIG. 2.

TABLE 3

| Sample ID | Free Asparagine (Boiling MQ-Water Extraction) mg/kg | | ASN mean mg/kg | Moisture % (w/w) | | Moisture mean % (w/w) | Free Asparagine (Boiling MQ-Water Extraction) mg/kg DM | ASN Reduction % |
| --- | --- | --- | --- | --- | --- | --- | --- | --- |
| S1 | 69 | 84 | 77 | 4.5 | 4.43 | 4.465 | 80 | 77 |
| S2 | 86 | 87 | 87 | 6.42 | 6.44 | 6.43 | 92 | 71 |
| S3 | 165 | 161 | 163 | 5.63 | 5.74 | 5.685 | 173 | 45 |
| S4 | 301 | 349 | 325 | 2.57 | 2.51 | 2.54 | 333 | 0 |
| S5 | 103 | 113 | 108 | 6.43 | 6.51 | 6.47 | 115 | 66 |
| S6 | 192 | 160 | 176 | 4.72 | 4.77 | 4.745 | 185 | 36 |

TABLE 3-continued

| Sample ID | Free Asparagine (Boiling MQ-Water Extraction) mg/kg | ASN mean mg/kg | Moisture % (w/w) | Moisture % (w/w) | Moisture mean % (w/w) | Free Asparagine (Boiling MQ-Water Extraction) mg/kg DM | ASN Reduction % |
|---|---|---|---|---|---|---|---|
| S7 | 136 | 204 | 170 | 2.54 | 2.51 | 2.525 | 174 | 55 |
| S8 | 251 | 269 | 260 | 6.61 | 6.67 | 6.64 | 278 | 17 |
| S9 | 69 | 68 | 69 | 5.72 | 6.06 | 5.89 | 73 | 77 |

Samples S1 and S9 achieved about a 77% reduction in free asparagine compared to the control sample (S4). Sample S1 was tempered for 14 hours in a tempering medium containing 2% asparagine-reducing yeast to a moisture level of 16%, while sample S9 was tempered for 30 hours in a tempering medium containing 2% asparagine-reducing yeast to a moisture level of 21%. Sample S2 achieved about a 71% reduction in free asparagine by tempering for 22 hours in a tempering medium containing 1% asparagine-reducing yeast to a moisture level of 21%.

Example 3

This example illustrates the reduction of acrylamide in a biscuit prepared using refined wheat flour and bran and germ obtained by tempering whole grains in a solution containing an asparagine-reducing yeast composition.

Experimental samples of whole wheat kernels were tempered in a solution containing an asparagine-reducing yeast. The yeast used in the tempering medium was a baker's yeast that had been grown on selective media to promote asparaginase activity. The whole grains had a moisture content of less than 15% prior to tempering. The yeast was dissolved in water and the solution was added to the tempering medium. Tempering was conducted under conditions illustrated in Table 4. The control sample was tempered in water without the asparagine-reducing yeast. Following tempering, the whole wheat kernels were milled without drying and a biscuit dough was prepared. The biscuit dough was baked for 415 seconds at a temperature between 190° C. and 250° C. The biscuits contained 33.5% refined flour obtained from the treated whole wheat kernels and 3% bran and germ obtained from the treated wheat kernels.

TABLE 4

| Sample | Yeast level (%) | Moisture (%) | Duration (hours) | Acrylamide content (ng/g) | Acrylamide reduction |
|---|---|---|---|---|---|
| Control | 0 | 16 | 14 | 399.5 | 0 |
| Run 1 | 2 | 20 | 14 | 303.5 | 24% |
| Run 2 | 2 | 18 | 22 | 207.5 | 48% |

As illustrated in Table 4, biscuits prepared using whole wheat flour obtained from wheat kernels treated with asparagine-reducing yeast during tempering showed a marked reduction in acrylamide content compared to the control biscuit tempered without the asparagine-reducing yeast.

Example 4

This example demonstrates further asparagine reduction that can be achieved when treating additional cereal ingredients in a biscuit with an asparagine-reducing yeast during tempering. Biscuits were prepared according to Example 3 such that they included the refined wheat flour and bran and germ obtained from the treated wheat kernels therein. Additional cereal ingredients included in the biscuit were oat flakes and other whole grain flours comprising a blend of rye, barley, and spelt. The additional cereal ingredients were treated with an asparagine-reducing yeast under the conditions illustrated in Table 5 and as described below. A biscuit dough was prepared and baked for 415 seconds at a temperature varying between 190° C. and 250° C. The biscuits contained 33.5% of the refined flour and 3% of the bran and germ obtained in Example 3, along with 9.5% oak flakes and 8% of the other whole grain flours comprising a blend of rye, barley, and spelt.

In one biscuit (identified as "Biscuit A" in Table 5), the oat flakes were tempered with the asparagine reducing yeast, while the other whole grain flours were not treated. In the second biscuit (identified as "Biscuit B" in Table 5), the other whole grain flours were treated with the asparagine-reducing yeast in water, while the oak flakes were not treated.

TABLE 5

| Biscuit ID | Treated Additional Ingredient | Yeast level (%) | Moisture (%) | Duration (hours) | Asparagine reduction |
|---|---|---|---|---|---|
| Biscuit A | Oat flakes | 2 | 30 | 22 | 72% |
| Biscuit B | Other whole grain flours (rye, barley, spelt) | 2 | 3 | 3 | 28.5 |

As illustrated in Table 5, Biscuit A containing treated wheat flour, treated bran and germ, treated oat flakes, and untreated other whole grain flours showed a 72% asparagine reduction compared to the control in Example 3. Biscuit B containing treated wheat flour, treated bran and germ, treated other whole grain flours, and untreated oat flakes showed a 28.5% asparagine reduction compared to the control in Example 3.

Example 5

This example illustrates the reduction of acrylamide in a biscuit wherein all cereal ingredients in the biscuit are treated with an asparagine-reducing yeast. A biscuit was prepared containing refined wheat flour and bran and germ treated in accordance with Example 3 and in the same amounts therein, and the oak flakes and other whole grain flours treated in accordance with Example 4 in the same amounts therein. As illustrated in Table 6, a biscuit in which all of the cereal ingredients were treated with an asparagine-reducing composition showed a 52% reduction in acrylamide content compared to the control in Example 3, in which none of the cereal ingredients were treated with an asparagine-reducing composition.

TABLE 6

| Sample | Acrylamide content (ng/g) | Acrylamide reduction |
| --- | --- | --- |
| Control | 300 | 0 |
| All grains treated | 145 | 52% |

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of reducing the asparagine content of whole grain flour for the production of baked goods, the method comprising:
   treating whole grains by tempering the whole grains in an aqueous solution of an asparaginase enzyme to provide a tempering mixture of the aqueous solution of the asparaginase enzyme and the whole grains to hydrate the whole grains and to degrade asparagine in the whole grains,
      wherein the concentration of the asparaginase enzyme in the aqueous solution during tempering is at least about 2550 ppm,
      wherein the aqueous solution is about 5% to about 15% by weight of the tempering mixture and the tempering is conducted for about 4 hours to about 24 hours to obtain a grain moisture content of from about 16 percent to about 22 percent and to hydrate bran and germ portions of the whole grains without substantially moistening endosperm portions of the whole grains so that asparaginase enzyme activity is concentrated in bran and germ portions of the whole grains, and
      wherein the treatment results in whole grains having a reduced asparagine content; and
   milling the tempered whole grains to obtain a whole grain flour having a reduced asparagine content.

2. The method of claim 1, wherein the asparaginase enzyme is derived from *Aspergillus oryzae*.

3. The method of claim 1, wherein the asparaginase enzyme has an asparaginase activity of about 3500 ASNU per gram of enzyme.

4. The method of claim 1, wherein the treatment reduces the asparagine content of the whole grain flour by at least about 25 percent.

5. The method of claim 1, wherein the whole grain flour has an asparagine content of no more than about 250 ppm.

6. The method of claim 1, wherein the tempering is conducted at ambient temperature.

7. The method of claim 1, wherein the tempering is conducted at a temperature of about 10° C. to about 60° C.

8. The method of claim 1, wherein at least some of the asparaginase enzyme is absorbed by the whole grains during tempering and is retained in the whole grain flour after milling.

9. The method of claim 1, wherein the milling comprises milling the whole grains to obtain a bran and germ fraction and an endosperm fraction.

10. The method of claim 9, wherein the bran and germ fraction is subjected to a stabilization treatment to form a stabilized bran and germ fraction, and the stabilized bran and germ fraction is combined with the endosperm fraction to form a stabilized whole grain flour having reduced levels of asparagine.

11. The method of claim 1, wherein the whole grains comprise one or more grains selected from the group consisting of wheat, oats, corn, rice, wild rice, rye, barley, buckwheat, bulgar, millet, spelt, and sorghum.

12. The method of claim 1, wherein the whole grains are uncooked prior to tempering.

13. A whole grain flour having a reduced asparagine content, the whole grain flour comprising asparaginase enzyme and obtained by the method of claim 1, wherein the whole grain flour has an asparagine reduction of at least about 25% compared to a control whole grain flour made from whole grains not treated with asparaginase enzyme, and an asparagine content of about 250 ppm or less.

14. A method of reducing the asparagine content of whole grain flour for the production of baked goods, the method comprising:
   treating whole grains by tempering the whole grains in an aqueous solution of an asparagine-reducing yeast to provide a tempering mixture of the aqueous solution of an asparagine-reducing yeast and the whole grains to hydrate the whole grains and to degrade asparagine in the whole grains,
      wherein the aqueous solution of an asparagine-reducing yeast is about 5% to about 15% by weight of the tempering mixture,
      wherein the asparagine-reducing yeast is included in an amount of about 0.1 to about 4.0 percent by weight of the tempering mixture,
      wherein the tempering is conducted for about 10 hours to about 32 hours to obtain a grain moisture content of from about 16 percent to about 22 percent and to hydrate bran and germ portions of the whole grains without substantially moistening endosperm portions of the whole grains so that asparagine-reducing yeast activity is concentrated in bran and germ portions of the whole grains, and
      wherein the treatment results in whole grains having a reduced asparagine content;
   milling the tempered whole grains to obtain a whole grain flour having a reduced asparagine content.

15. The method of claim 14, wherein the treatment reduces the asparagine content of the whole grain flour by at least about 25 percent.

16. The method of claim 14, wherein the tempering is conducted at a temperature of about 10° C. to about 60° C.

17. The method of claim 14, wherein the milling comprises milling the whole grains to obtain a bran and germ fraction and an endosperm fraction and wherein the bran and germ fraction is subjected to a stabilization treatment to form a stabilized bran and germ fraction, and the stabilized bran and germ fraction is combined with the endosperm fraction to form a stabilized whole grain flour having reduced levels of asparagine.

18. A whole grain flour having a reduced asparagine content, the whole grain flour comprising asparagine-reducing yeast and obtained by the method of claim 14, wherein the whole grain flour has an asparagine reduction of at least about 25% compared to a control whole grain flour made from whole grains not treated with asparagine-reducing yeast, and an asparagine content of about 250 ppm or less.

* * * * *